United States Patent
Don

(10) Patent No.: US 9,388,087 B2
(45) Date of Patent: Jul. 12, 2016

(54) GLASS CERAMICS BASED ANTIOXIDANTS FOR THE OXIDATION PROTECTION OF CARBON-CARBON COMPOSITES

(71) Applicant: Board of Trustees, Southern Illinois University, Carbondale, IL (US)

(72) Inventor: Jarlen Don, Carbondale, IL (US)

(73) Assignee: BOARD OF TRUSTEES, SOUTHERN ILLINOIS UNIVERSITY, Carbondale, IL (US)

( * ) Notice: Subject to any disclaimer, the term of this patent is extended or adjusted under 35 U.S.C. 154(b) by 0 days.

(21) Appl. No.: 14/212,666

(22) Filed: Mar. 14, 2014

(65) Prior Publication Data

US 2014/0349016 A1 Nov. 27, 2014

Related U.S. Application Data

(60) Provisional application No. 61/782,368, filed on Mar. 14, 2013.

(51) Int. Cl.
| | |
|---|---|
| *C04B 41/50* | (2006.01) |
| *C04B 41/85* | (2006.01) |
| *C04B 41/00* | (2006.01) |
| *F16D 69/02* | (2006.01) |
| *C04B 111/00* | (2006.01) |

(52) U.S. Cl.
CPC ............ *C04B 41/85* (2013.01); *C04B 41/009* (2013.01); *C04B 41/5092* (2013.01); *F16D 69/023* (2013.01); *C04B 2111/00362* (2013.01); *F16D 2200/0047* (2013.01); *F16D 2250/0046* (2013.01)

(58) Field of Classification Search
CPC .................................................. C04B 41/5092
See application file for complete search history.

(56) References Cited

U.S. PATENT DOCUMENTS

| | | | |
|---|---|---|---|
| 4,837,073 A | 6/1989 | McAllister | |
| 5,401,440 A | 3/1995 | Stover | |
| 5,759,622 A | 6/1998 | Stover | |
| 6,455,159 B1 | 9/2002 | Walker | |
| 6,737,120 B1 | 5/2004 | Golecki | |
| 7,501,181 B2 | 3/2009 | Walker | |
| 2004/0213906 A1 | 10/2004 | Mazany | |

OTHER PUBLICATIONS

Aoki T et al. SiC/C Multi-Layered Coating Contributing to the Antioxidation of C/C Composited and the Suppression of Through-Thickness Cracks in the Layer. Carbon, 2001, vol. 39, pp. 1477-1483.
Barmak K. A Commentary on: "Reaction Kinetics in Processes of Nucleation and Growth". Metallurgical and Materials Transactions A, 2010, vol. 41A, pp. 2711-2775.
Brow RK. Review: The Structure of Simple Phosphate Glasses. Journal of Non-Crystalline Solids, 2000, vol. 263&264, pp. 1-28.
Cairo C et al. Kinetic Study by TGA of the Effect of Oxidation Inhibitors for Carbon-Carbon Composite. Materials Science and Engineering A, 2003, vol. 358, pp. 298-303.
Corral E & Loehman R. Ultra-High-Temperature Ceramic Coatings for Oxidative Protection of Carbon-Carbon Composites. Journal of the American Ceramic Society, 2008, vol. 91, pp. 1495-1502.
Dhami T et al. Oxidation-Resistant Carbon-Carbon Composited up to 1700°C. Carbon, 1995, vol. 33, pp. 479-490.
Don J & Wang Z. Effects of Anti-Oxidant Migration on Friction and Wear of C/C Aircraft Brakes. Applied Composite Materials, 2009, vol. 16, pp. 73-81.
Fu Q et al. A SiC/Glass Oxidation Protective Coating for Carbon/Carbon Composited for Application at 1173 K. Carbon, 2007, vol. 45, pp. 892-902.
Grandini CR et al. Anelastic Spectroscopy in Potassium Aluminum Metaphosphate Glasses. Journal of Non-Crystalline Solids, 2006, vol. 352, pp. 3410-3413.
Jian-Feng H. ZrO2-SiO2 Gradient Multilayer Oxidation Protective Coating for SiC Coated Carbon/Carbon Composites. Surface and Coatings Technology, 2005, vol. 190, pp. 255-259.
Karabulut M et al. Structure and Properties of Lanthanum-Aluminum-Phosphate Glasses. Journal of Non-Crystalline Solids, 2001, vol. 283, pp. 211-219.
Kawatra SK & Ripke SJ. Developing and Understanding the Bentonite Fiber Bonding Mechanism. Minerals Engineering, 2001, vol. 14, pp. 647-659.
Kim JI et al. Design of a C/SiC Functionally Graded Coating for the Oxidation Protection of C/C Composites. Carbon, 2005, vol. 43, pp. 1749-1757.
Kishioka A et al. Glass Formation and Crystallization in Ternary Phosphate Systems Containing Al2O3. Bulletin of the Chemical Society of Japan, 1976, vol. 49, pp. 3032-3036.
Lee J. Property Enhancements via Matrix Microstructure Modification of Carbon-Carbon Composites Prepared by CVI Processing. Journal of Materials Science, 2005, vol. 40, pp. 3573-3575.
Li T & Zheng X. Oxidation Behavior of Matrix-Modified Carbon-Carbon Composited at High Temperature. Carbon, 1995, vol. 33, pp. 469-472.
Lu W & Chung DDL. Oxidation Protection of Carbon Materials by Acid Phosphate Impregnation. Carbon, 2002, vol. 40, pp. 1249-1254.
Maier CR & Jones LE. The Influence of Aluminum Phosphates on Graphite Oxidation. Carbon, 2005, vol. 43, pp. 2272-2276.

(Continued)

*Primary Examiner* — Peter F Godenschwager
(74) *Attorney, Agent, or Firm* — Mark Stallion; Husch Blackwell LLP

(57) ABSTRACT

Liquid anti-oxidants made by mixing specific chemical compositions disclosed herein, followed by thorough stirring so that a homogeneous blend of colloidal-like solutions are obtained. Such liquid anti-oxidants are applied to the surface of the carbon-carbon composite that is needed to be protected against oxidation by brushing, dipping, spraying, or other painting techniques, and allowed sufficient time for the anti-oxidants to penetrate into the subsurface region of the composite and to let dry in a dry atmosphere. The coated carbon/carbon composites can be heat treated (or charred) at a temperature of about approximately 650 to 950° C. for a time period of about approximately one to seven hours. The above painting/heat treating processes can be repeated one to three or more times in order to obtain sufficient anti-oxidant char on or below the surface to a certain depth of the composite.

6 Claims, 4 Drawing Sheets

(56) References Cited

OTHER PUBLICATIONS

Mohanty MK & Honaker RO. Performance Optimization of Jameson Flotation Technology for Fine Coal Cleaning. Minerals Engineering, 1999, vol. 12, pp. 367-381.
Park S & Seo M. The Effects of MoSi2 on the Oxidation Behavior of Carbon/Carbon Composites. Carbon, 2001, vol. 39, pp. 1229-1235.
Sarkisov P et al. Barrier Coatings for Type C/SiC Ceramic-Matrix Composites (Review). Glass and Ceramics, 2008, vol. 65, pp. 366-371.
Schneider J et al. Short-Range Structure and Cation Bonding in Calcium-Aluminum Metaphosphate Glasses. Inorganic Chemistry, 2005, vol. 44, pp. 423-430.
Smeacetto F et al. Oxidation Protective Multilayer Coatings for Carbon-Carbon Composited. Carbon, 2002, vol. 40, pp. 583-587.
Smeacetto F et al. Multilayer Coating with Self-Sealing Properties for Carbon/Carbon Composites. Carbon, 2003, vol. 41, pp. 2105-2111.
Story S & Fruehan R. Kinetics of Oxidation of Carbonaceous Materials by CO2 and H2O Between 1300°C and 1500°C. Metallurgical and Materials Transactions B, 2000, vol. 31B, pp. 43-54.
Tang Z et al. Effects of Carrier Gas on Densification of Porous Carbon-Carbon Composites During Chemical Vapor Infiltration. Journal of Central South University of Technology, 2003, vol. 10, pp. 7-12.
Wu X & Radovic L. Catalytic Oxidation of Carbon/Carbon Composite Materials in the Presence of Potassium and Calcium Acetates. Carbon, 2005, vol. 43, pp. 333-344.
Wu X & Radovic L. Inhibition of Catalytic Oxidation of Carbon/Carbon Composites by Boron-Doping. Carbon, 2005, vol. 43, pp. 1768-1777.
Wu X & Radovic L. Inhibition of Catalytic Oxidation of Carbon/Carbon Composites by Phosphorous. Carbon, 2006, vol. 44, pp. 141-151.
Xu Y et al. Oxidation Behavior and mechanical Properties of C/SiC Composites with Si-MoSi2 Oxidation Protection Coating. Journal of Materials Science, 1999, vol. 34, pp. 6009-6014.
Yamamoto O et al. Antioxidation of Carbon-Carbon Composites by SiC Concentration Gradient and Zircon Overcoating. Carbon, 1995, vol. 33, pp. 359-365.
Yan Z et al. Oxidative Behavior of Oxidation Protective Coatings for C/C-SiC Composited at 1500°C. Transactions of Nonferrous Metals Society of China, 2009, vol. 19, pp. 61-64.
Yu-Lei Z et al. An Oxidation Protective Si-Mo-Cr Coating for C/SiC Coated Carbon/Carbon Composites. Carbon, 2008, vol. 46, pp. 179-182.
Zhang Y et al. Si-Mo-Cr Coating for C/SiC Coated Carbon/Carbon Composites Against Oxidation. Surface Engineering, 2012, vol. 28, pp. 544-547.
Zmii V et al. Carboborosilicate and Oxide Composite Coatings on Carbon Materials. Powder Metallurgy and Metal Ceramics, 2006, vol. 45, pp. 124-128.
Peter J. Blau, Compositions, functions, and testing of friction brake materials and their additives, ORNL/TM-2001/64, Metals and Ceramic Division, Aug. 2001, Oak Ridge, Tennessee.
D. W. McKee, Carbon oxidation catalyzed by low melting-point oxide phases, Carbon, vol. 25, 1987, pp. 587-588.
D.W. McKee, Oxidation behavior and protection of carbon/carbon composites, Carbon, vol. 25, 1987, pp. 551-557.
D.W. McKee, Oxidation behavior of matrix-inhibition carbon/carbon composites, Carbon, vol. 26, 1988, pp. 659-665.
D.W. McKee, Borate treatment of carbon fibers and carbon/carbon composites for improved oxidation resistance, Carbon, vol. 24, 1986, pp. 737-741.
Biamino, S., Liedtke V., Badini C., Euchberger G., Olivares I., Pavese M., Fino P., Multilayer SiC for thermal protection system of space vehicles: Manufacturing and testing under simulated re-entry conditions, Journal of the European Ceramic Society, vol. 28, 2008, pp. 2791-2800.
Bacos, M., Carbon-carbon composites: oxidation behavior and coatings protection, Journal De Physique IV, vol. 3, 1993, pp. 1895-1903.
Tatarzicki, Y., Webb, R., Friction and Wear of Aircraft Brakes, ASM Handbook, vol. 18, 1992, pp. 582-587.

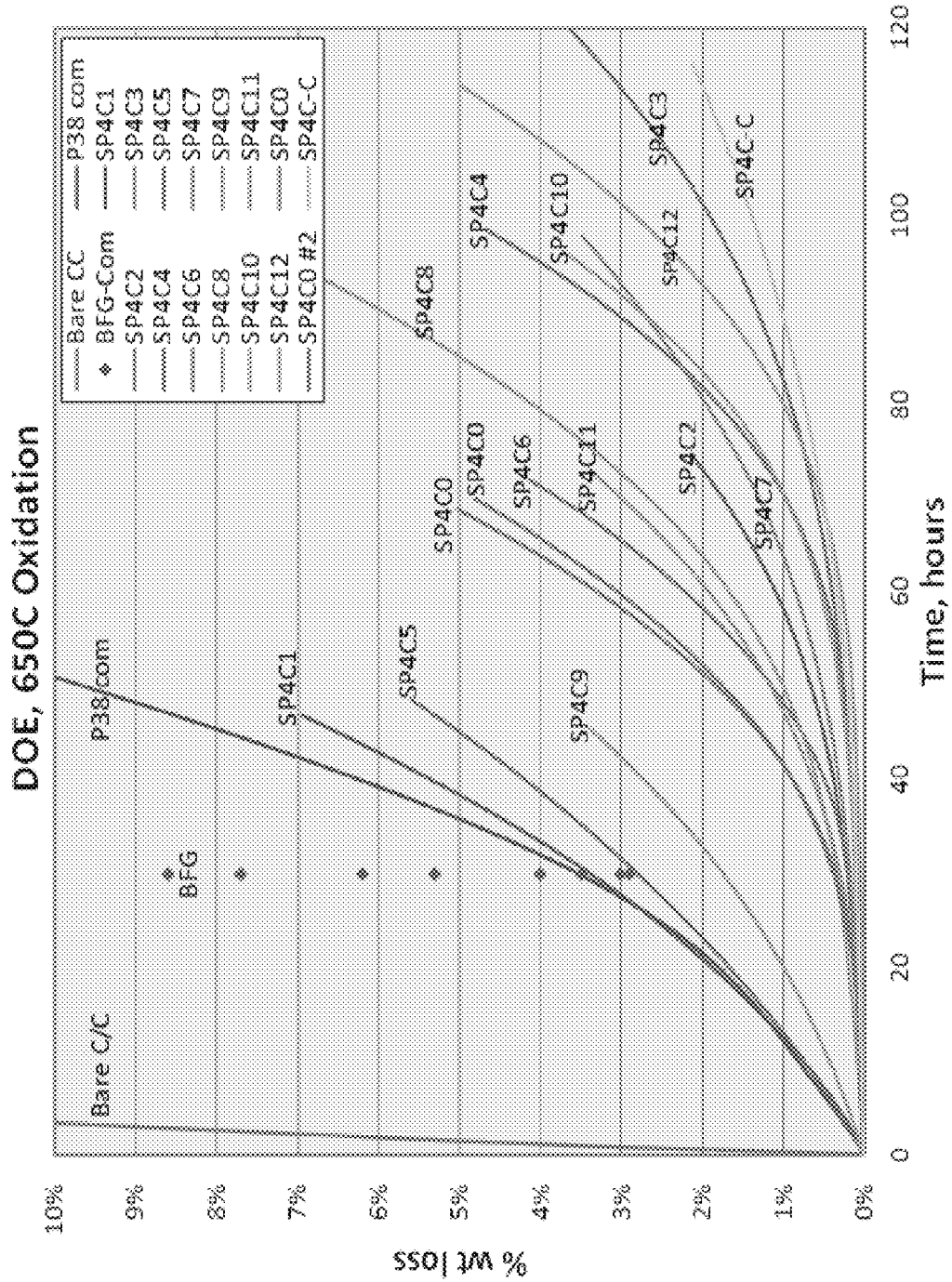
FIG. 1 Oxidation test results of SP4C series of anti-oxidants, comparing with two groups of commercial materials.

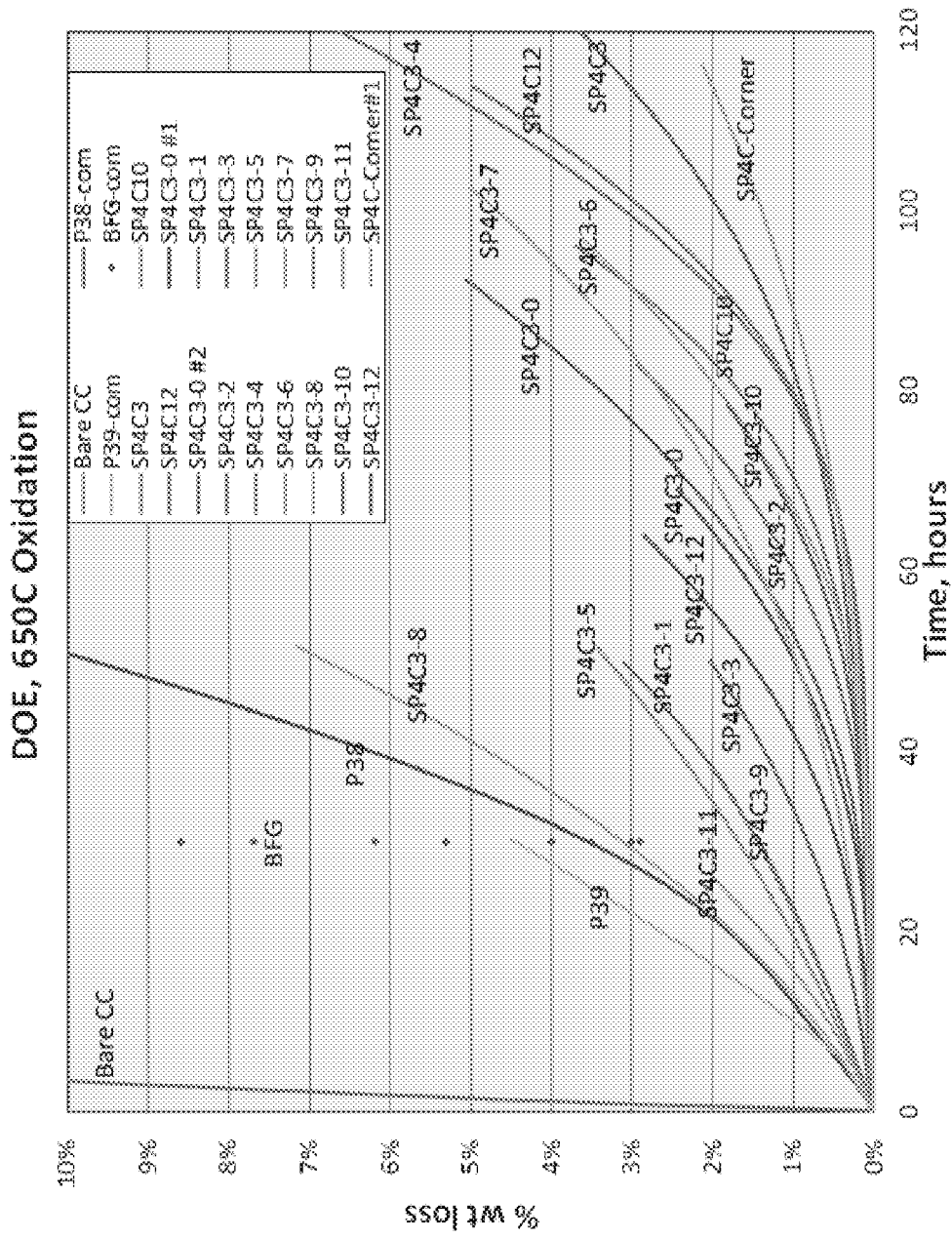
FIG. 2 Oxidation test results of SP4C3 series of anti-oxidants, comparing with two groups of commercial materials.

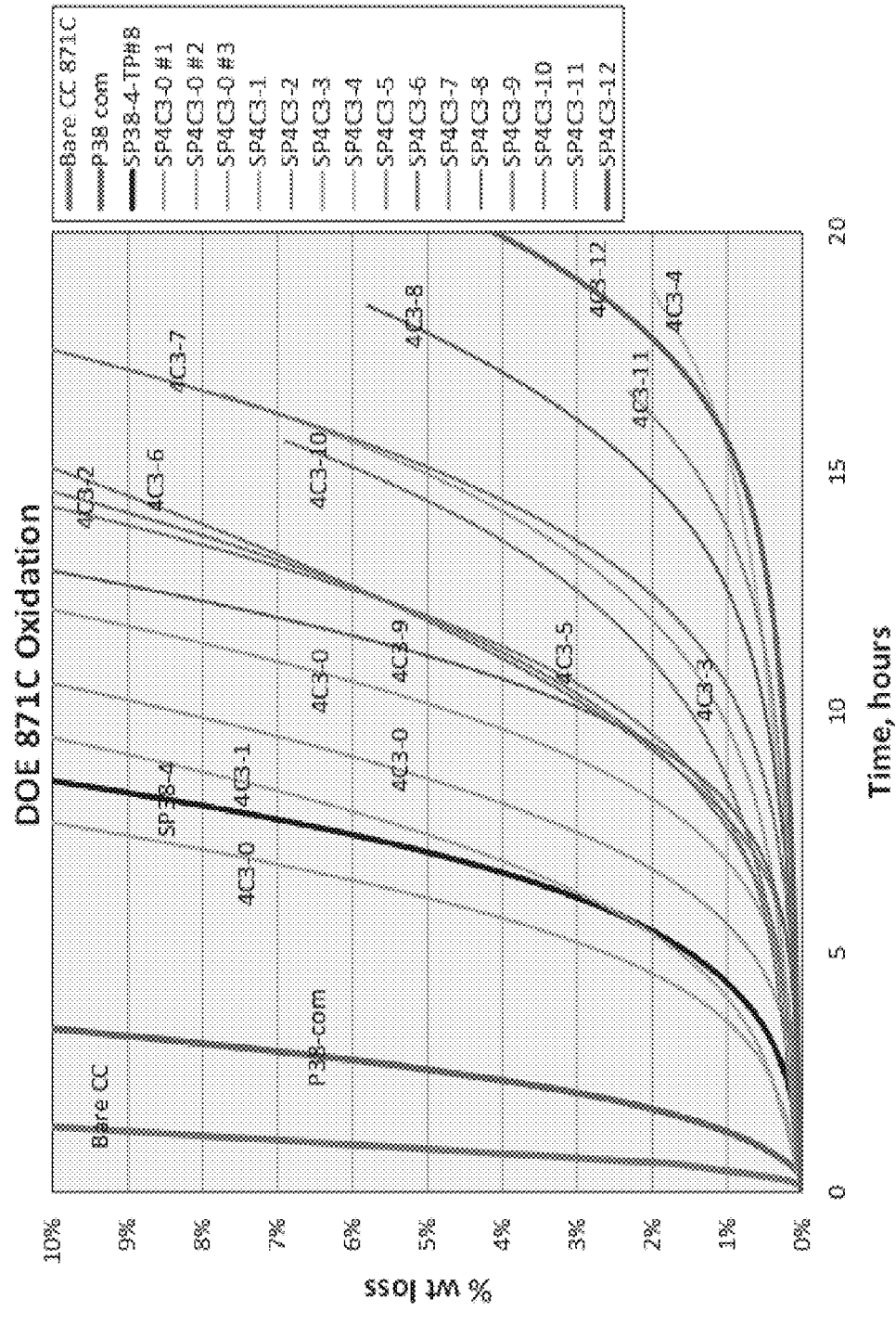
FIG. 3 871°C oxidation test results of SP4C3 series of anti-oxidants, comparing with a commercial material.

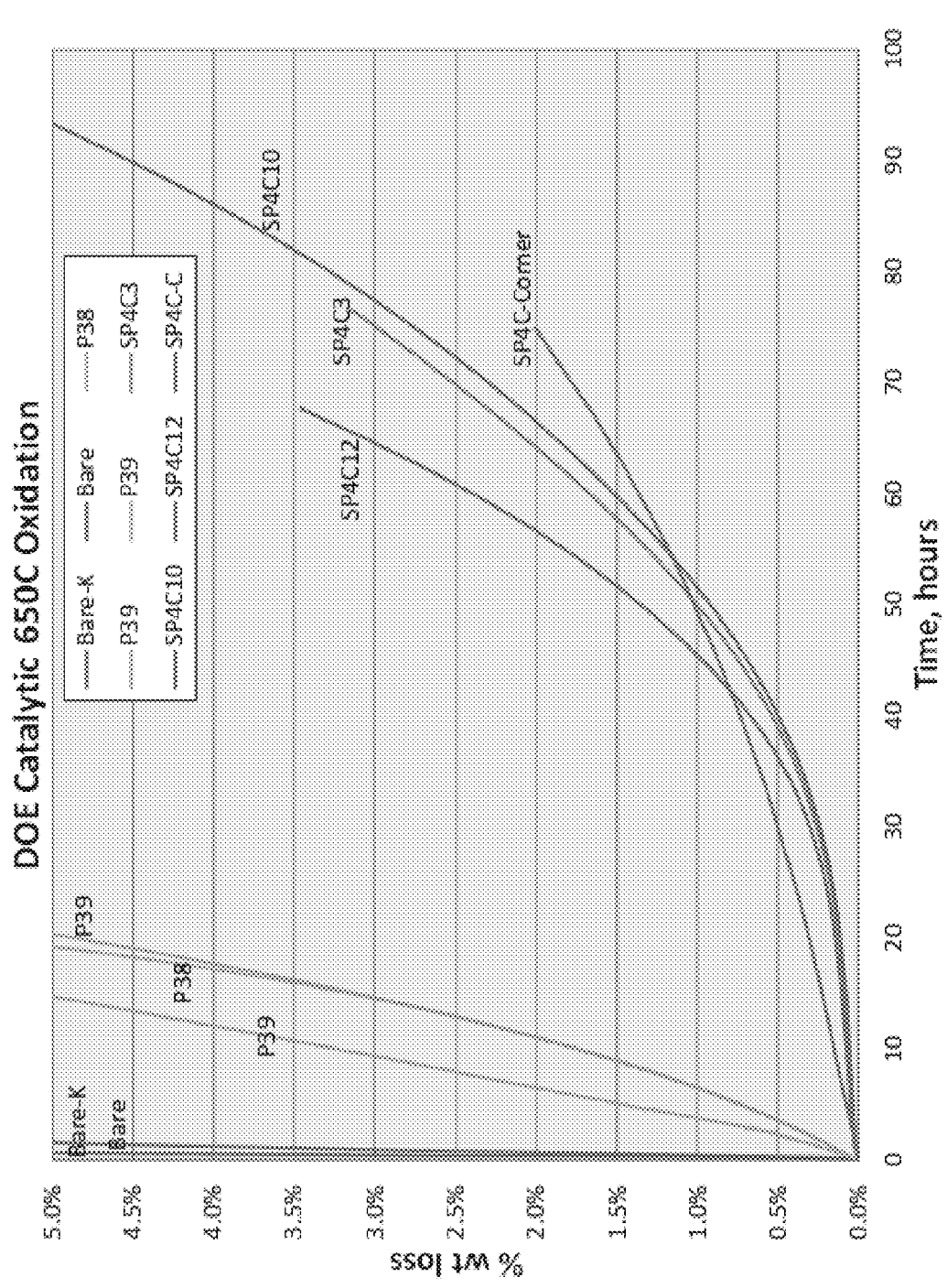
FIG. 4 Catalytic Oxidation at 650C using potassium acetate catalyst

GLASS CERAMICS BASED ANTIOXIDANTS FOR THE OXIDATION PROTECTION OF CARBON-CARBON COMPOSITES

CROSS REFERENCE

This application Claims The Benefit Of And Priority To U.S. Provisional Application Ser. No. 61/782,368, Filed Mar. 14, 2013 And Entitled Glass-Ceramics Based Antioxidants For The Oxidation Protection Of Carbon-Carbon Composites and is incorporated herein by reference in its entirety

BACKGROUND

1. Field

This technology relates generally to oxidation protection and, more particularly, to oxidation protection for carbon composites.

2. Background Art

Carbon-carbon (C/C) composite brakes are one third the weight of typical steel brakes, and they attain strength and frictional properties at temperatures up to 1600° C. C/C brakes can endure high temperatures, but in the presence of oxygen they will begin to oxidize at 400° C. Anti-oxidant systems must be applied to the non-rubbing surfaces of the C/C composite stators and rotors to prevent oxidation. Currently, commercial phosphorus based coating materials are made of crystalline metal phosphates that are derived from heat treated phosphoric acid-based liquid precursors painted on the non-rubbing surface of C/C composites [1,3,5]. These crystalline metal phosphate coatings are very porous and tend to move to the friction surface when exposed to increased levels of relative humidity.

This anti-oxidant migration towards the rubbing surface causes a drop in frictional properties. To improve the performance and stabilize phosphorus based systems, other factors such as the crystal structure, glass transition temperature, and the re-crystallization of glass products at elevated temperatures must be taken into consideration along with the opening of pores within the composite [4]. Adjusting the amounts of glass formers, glass network modifiers, and glass intermediates will alter the coatings performance and stability by changing the chemistry of the phosphorus based glass. Glass formers used in the anti-oxidant systems include phosphorus and boron because they can resist some catalytic oxidation effects, inhibit oxidation, and exhibit selfhealing capabilities which is great for constant cyclic conditions. Glass network modifiers found in anti-oxidants are commonly potassium, sodium, calcium, and manganese elements. Typical glass intermediates are aluminum and zinc oxides [5].

Carbon fiber friction materials have great retention of strength and stiffness at elevated temperatures, but begin to oxidize when exposed to air at temperatures at or above 400° C. [6].

Current barrier coatings are typically classified by their functional temperature ranges of oxidation protection into two classifications: high temperature coatings and low to moderate temperature coatings. Aoki [1,9] studied through thickness cracks in high temperature SiC coatings. Due to a large mismatch in the thermal expansion coefficients of the SiC surface layer and the C/C composite, many cracks form in the surface layer which leads to severe oxidation-degradation [1,9]. Walker patented a multilayer protection system for C/C aircraft brakes which was comprised of a SiC coating on top of a phosphoric acid-based penetrant coating [5]. This system improves upon the oxidation protection systems of C/C by having a phosphorus based glass system beneath the cracks in the SiC layer. Cracks that are formed due to the thermal mismatch and cyclic conditions can be closed by the self-healing property of this specific phosphorus glass layer [20]. Multilayer antioxidant systems [21-32] are commonly utilized at moderate to elevated temperatures, but for C/C composites brake applications these techniques are not as economical as compared to the simple phosphate based systems designed for the application of lower to moderate temperature protection ranges.

Low to moderate temperature oxidation protection systems have a temperature protection range from 400° C. to approximately 900° C. [6, 33]. This margin is within the temperature range of typical aircraft brake applications. These protection systems usually contain glass formers of boron oxide and metal phosphate materials that are able to actively protect the composite in the low to moderate temperature range. Common weaknesses that are associated with phosphorus based anti-oxidants include sensitivity to moisture, elevated oxygen permeability, and high vapor pressure. These factors tend to cause Antioxidant Migration (AOM) onto friction surfaces, therefore leading to low frictional properties [18].

A patent application by Golecki [34] overviewed different fluidized glass materials such as phosphate glass, borate glass, silicate glass, and plumbate that can potentially protect carbon fiber or C/C composite materials from oxidation. These phosphorus based glasses include phosphates of aluminum, manganese, zinc, nickel, vanadium, and/or alkaline earth metals such as potassium, sodium, magnesium, calcium, and even lithium. One specific composition disclosed by Golecki is capable of impregnating and protecting a C/C composite material. The composition is 29 wt % phosphoric acid ($H_3PO_4$), 2 wt % manganese phosphate, 3 wt % potassium hydroxide, 1 wt % boron nitride, 10 wt % boron, and 55 wt % water.

Patents from Stover [35, 36] contain phosphorus based antioxidants that are capable of impregnating C/C composites and inhibiting the catalytic effect from anti-icing and de-icing agent contamination on the runways. The mixture was comprised of (a) phosphoric acid, (b) a metal phosphate, and (c) a C/C composite compatible wetting agent. The percent weight composition of each chemical was as follows; phosphoric acid 50-75 wt %, the metal phosphate is 25-50 wt %, and the wetting agent was around 0.3-3 wt %. Another weight percent composition was water 40-70 wt %, phosphoric acid 50-75 wt %, metal phosphate 25-45 wt %, and the wetting agent 0.3-3 wt %. Molar ratio of aluminum to phosphorus elements in the antioxidant mixture varied from approximately 0.2 to 0.8. The aqueous mixture was then applied by painting, dipping, or spraying the susceptible regions that are exposed to oxygen such as the inner and outer diameters of the rotor and stator discs.

A patent from Walker [5] contains a phosphoric acid based penetrant salt solution that is known as P13. The percent weight composition of each chemical was as follows: water 10-80 wt %, phosphoric acid 20-70 wt %, manganese phosphate 0-25 wt %, boron oxide 0-2 wt %, and an alkali metal mono-, di-, or tri-basic phosphate 0.1-25 wt %. The penetrant salt solution can also be applied to the composites surface by painting, dipping, or even spraying. The coated composite is then heat treated, at a temperature ranging from 500° C. to 900° C., so that solid char is produced from the coated solution. The barrier coating thickness varies between 1 and 10 millimeters thick according to the number of char cycles. Shelf life has been an issue with phosphoric acid based systems. However, the patent stated the shelf life of the product and the migration of phosphorus to the rubbing surface both increased substantially. It was also stated that this particular antioxidant system prevents catalytic oxidation by blocking the active sites on the carbon surface with metal phosphate deposits [37].

Wu [38-40] compiled a series of papers that studied the catalytic effect of potassium and calcium acetates on C/C composite aircraft brake materials. Exposure of the brake disc to catalytic materials, such as runway deicers, often leads to rapid wear and decomposition. Wu studied oxygen containing phosphorus groups that suppress the catalytic oxidation effect of C/C composites by blocking the active sites on the carbon surface. The salt-derived catalyst materials that were examined in the paper were potassium acetate and calcium acetate runway deicers. The catalytic effect of calcium acetate was almost completely suppressed by the deposited phosphorus groups.

The effects from potassium acetates were partially suppressed due to the superior wettability and mobility of potassium. Wu also studied the catalytic resistance effects of deposited boron oxide on C/C composites. It was documented that boron oxide was the deposited boron material located on the outermost surface of the carbon substrate. The boron doping study showed nearly a complete suppression of calcium acetate due to its poor ability to maintain direct contact with the carbon substrate. Boron oxide still showed little suppression of potassium acetate because of its great ability to maintain direct contact with the substrate s surface. Potassium's ability to migrate into any exposed surface region in order to maintain interfacial contact with carbon makes potassium acetates very caustic to C/C composite materials. Mazany [41] presented a phosphorus based antioxidant that infiltrates most open pores within the composite. The chemicals that are present in the antioxidant are as follows: phosphoric acid or an acid phosphate salt, at least one aluminum salt, and at least one additional metal salt. It was pointed out by McKee [42] that phosphates can deactivate many catalytic impurities from the carbon surface by converting them into inactive and stable phosphates. This patent also refers to an antioxidant that is more resistant to AOM by adjusting the metal to phosphate ratio. This stabilization of the phosphate material makes the antioxidant better suited, economically, for commercial C/C composite aircraft brakes.

BRIEF SUMMARY

The technology disclosed and claimed herein relates to a series of glass-ceramic coating materials for the oxidation protection of carbon-carbon aircraft brakes are disclosed in this invention. Currently, commercial coating materials are made of crystalline metal phosphates that are derived from heat treating phosphoric acid-based liquid precursors that were painted on the surface of carbon-carbon composites. The coatings tend to be porous, discontinuous and sensitive to moisture. The glass-ceramic coating systems disclosed in this invention are derived from uniquely formulated liquid precursors which, after heat treating, produce dense coatings comprising crystalline ceramic particles that are bonded by a continuous matrix phase of glass. All three types of key elements in the formulation of glasses are used in the liquid precursors of this invention: (1) glass formers—Phosphorous and Boron—(P and B), (2) glass network modifiers—Potassium, Sodium, Calcium and Magnesium (K, Na, Ca, and Mg), and (3) glass intermediates—Aluminum, Manganese and Zinc—(Al, Mn and Zn). Upon heating, the above chemicals turn into an oxide mixture and form a glass-ceramic coating material that is properly penetrated to a certain depth into the carbon-carbon composite to be protected. The base oxides of the glass-ceramic coating may be composed of $P_2O_5$, $B_2O_3$, $Al_2O_3$, $K_2O$, $Na_2O$, $CaO$, and $MgO$. During heat treatment, these base oxides may react and form complicated oxides, phosphates, and glass. The raw materials that can be used in the formulation of anti-oxidants for facilitating the above oxides are phosphoric acid, $Al(H_2PO_4)_3$, $B_2O_3$, $Al_2O_3$, $K_2CO_3$, $KNO_3$, $KOH$, $KCl$, $Na_2CO_3$, $NaNO_3$, $NaCl$, $NaOH$ $CaCl2$, $CaCl_2$ hydrates, $CaCO_3$, $MgCl_2$, $MgCl_2$ hydrates, $MgCO_3$, $KHBO_4$, $KH_2PO_4$, $K_2B_4O_7*10(H_2O)$, $NaH_2PO_4$, $Na_2B_4O_7*4(H_2O)$, and $B_2O_3$. The base oxides and their source raw materials covered in this invention are listed in Table 1.

TABLE 1

Base oxides and raw chemicals for the oxides used in the anti-oxidants.

| Base Oxides | Source Raw Materials |
|---|---|
| $P_2O_5$ | 85% $H_3PO_4$, $Al(H_2PO_4)_3$, $KH_2PO_4$, $NaH_2PO_4$, ... |
| $B_2O_3$ | $B_2O_3$, $K_2B_4O_7*10(H_2O)$, $Na_2B_4O_7*4(H_2O)$, ... |
| $Al_2O_3$ | $Al(H_2PO_4)_3$, $Al_2O_3$, ... |
| $K_2O$ | $K_2CO_3$, $KNO_3$, $KCl$, $KOH$, $KH_2PO_4$, ... |
| $Na_2O$ | $NaCO_3$, $NaNO_3$, $NaCl$, $NaOH$, $NaH_2PO_4$, |
| $CaO$ | $CaCO_3$, $CaCl_2$ |
| $MgO$ | $MgCO_3$, $MgCl_2$ |

The advanced antioxidants covered in this invention protected the C/C composite from thermal oxidation at 871° C. (1600° F.) about ten times better than commercial materials, and from catalytic oxidation, with potassium catalyst at 650° C., about six to ten times better than commercial materials. Furthermore, the contamination of the anti-oxidant to friction surfaces, which can reduce friction force, was practically eliminated as a result of the advanced formulation of the anti-oxidant.

These and other advantageous features of the present invention will be in part apparent and in part pointed out herein below.

BRIEF DESCRIPTION OF THE DRAWINGS

For a better understanding of the present invention, reference may be made to the accompanying drawings in which:

FIG. 1 shows experimental results from the 650° C. oxidation tests of CC samples coated with anti-oxidants SP4C1 through 15;

FIG. 2 shows experimental results from the 650° C. oxidation tests of CC samples coated with anti-oxidants SP4C3-1 through 12;

FIG. 3 shows experimental results from the 871° C. oxidation tests of CC samples coated with anti-oxidants SP4C3-1 through 12; and FIG. 4 compares commercially available antioxidants (P38 and P39) to the SP4C anti-oxidants when exposed to potassium formate catalyst.

DETAILED DESCRIPTION OF INVENTION

According to the embodiment(s) of the present invention, various views are illustrated in FIGS. 1-4 and like reference numerals are being used consistently throughout to refer to like and corresponding parts of the invention for all of the various views and figures of the drawing. Also, please note that the first digit(s) of the reference number for a given item or part of the invention should correspond to the Fig. number in which the item or part is first identified.

One embodiment of the present technology comprising glass-ceramics based anti-oxidant teaches a novel apparatus and method for treating surfaces for oxidation protection.

The details of the invention and various embodiments can be better understood by referring to the figures of the drawing. Referring to the Figures, a commercial C/C composite was used to test and develop the anti-oxidants disclosed and claimed herein. The composite is made of a 3-dimensional non-woven fiber architecture which is infiltrated with pyrolytic chemical vapor deposition (CVD) carbon matrix material. The density of the composite ranges from 1.6 to 1.8 g/cm³. Sample disks of 2 inches in diameter and 1 inch thick cut from as-received brake discs were used for oxidation testing.

Design of Anti-Oxidants

The design of the anti-oxidants was based on mixing appropriate percentages of glass formers, glass network modifiers, and glass intermediates that were derived from a variety of raw materials after char heat treatments.

An anti-oxidant that has been applied to the C/C composite sample can be heat treated or "charred" to form a stable glass and crystalline ceramics mixture of coating material. This char process can take place in a controlled nitrogen atmosphere within a furnace heated to approximately 700° C. to 900° C. This elevated temperature allows for the release of solvent and chemically bonded water, along with other volatile species, from the liquid anti-oxidant mixture and yields a solid char coating.

Oxidation Test:

Thermal oxidation tests were performed at isothermal temperatures of 650° C. and 871° C. The two common runway deicers and anti-icing agents that were tested are potassium acetate and calcium chloride. Once the 2 inch by 1 inch thick C/C samples have been coated on all surfaces and charred with three char cycles, the samples were then exposed to the catalyst. The samples were completely submerged in the catalyst solution for a total of 30 minutes to allow for proper penetration into the samples surfaces. Catalytic oxidation testing was only conducted at an isothermal temperature of 650° C. and an atmospheric air flow rate of 5 Standard Liters Per Minute (slpm).

Potassium acetate catalyst was applied to the samples by soaking in a catalyst solution of 75 weight percent water and 25 weight percent potassium acetate at 25° C. Separate testing with calcium chloride was performed by soaking the coated samples in a catalyst solution with 50 weight percent water and 50 weight percent calcium chloride at 50° C. After catalysts soaking, samples are dried in an oven at 80° C. for at least 8 hours to ensure proper drying of the catalyst in the samples.

Char Yield Design:

The char yield of the anti-oxidant is critical to the design for any antioxidant system. Following heat treatment process at 900° C., solid that is produced from the liquid anti-oxidants is a mixture of oxide materials known as char. The composition of the char in terms of the percentages of oxides can be calculated theoretically. Generally, theoretical char yields and experimental char yields are shown to have significant agreement to within one or two weight percentage points. The individual char compositions of each oxide forming group by weight are 30-75 wt % $P_2O_5$, 3-25 wt % $Al_2O_3$, 0-20 wt % $K_2O$, 0-20 wt % $Na_2O$, 0-20 wt % CaO, 0-20% MgO, 0-10 wt % $SiO_2$, and 2-25 wt % $B_2O_3$. This composition range was used throughout the design of the antioxidant systems covered in this invention.

Anti-oxidants can be defined by their individual source chemical formulations or the individual oxide char material content after heat treatment. The oxide char materials which can be produced by a variety of raw chemicals are described by the chemical reactions listed below:

$$H3PO4 = (3/2)H2O + (1/2)P2O5 \quad \text{Equation 1}$$

$$Al(H2PO4)3 = (3)H2O + (1/2)Al2O3 + (3/2)P2O5 \quad \text{Equation 2}$$

$$Al2O3 = (O)H2O + (1)Al2O3 \quad \text{Equation 3}$$

$$KH2PO4 = (1)H_2O + (1/2)P2O5 + (1/2)K2O \quad \text{Equation 4}$$

$$K2CO3 = (O)H_2O + (1)CO2 + (1)K2O \quad \text{Equation 5}$$

$$KOH = (1/2)H_2O + (1/2)K2O \quad \text{Equation 6}$$

$$KCL + (1/2)H2O = (1/2)K2O + (1/2)H2 + (1/2)Cl2 \quad \text{Equation 7}$$

$$K2B4O7 = (1)K2O + (2)B2O3 \quad \text{Equation 8}$$

$$B2O3 = (O)H_2O + (1)B2O3 \quad \text{Equation 9}$$

$$Na2B4O7 = (1)Na2O + (2)B2O3 \quad \text{Equation 10}$$

$$NaH2PO4 = (1)H2O + (1/2)P2O5 + (1/2)Na2O \quad \text{Equation 11}$$

$$Na2CO3 = (O)H_2O + (1)CO2 + Na2O \quad \text{Equation 12}$$

$$NaOH = (1/2)H_2O + (1/2)Na2O \quad \text{Equation 13}$$

$$NaCl + (1/2)H_2O = (1/2)Na_2O + (1/2)H2 + (1/2)Cl2 \quad \text{Equation 14}$$

$$CaCl2 + (1/2)H2O = (1)CaO + (1/2)H2 + (1)Cl2 \quad \text{Equation 15}$$

$$CaCO3 = (1)CaO + (1)CO2 \quad \text{Equation 16}$$

In Equation 1, the phosphoric acid (H3PO4) brakes down during heat treatment. As a result of the reaction, water (H2O) is formed and released, and solid phosphorus oxide (P2O5) remains as a char yield. Char yields of each chemical can then be integrated into mixing formulations to produce a total char yield and the associated weight loss for any anti-oxidant solution. For examples, source materials from Equation 1, Equation 2, Equation 4, and Equation 11 are possible sources of phosphorus oxide char material after the heat treatment process. Source materials from Equation 2 and Equation 3 are possible sources of aluminum oxide char material. Source materials from Equations 4 through 8 are possible sources of potassium oxide char material. Source materials from Equations 10 through 14 are possible sources of sodium oxide char material. Source materials from Equation 8 through 10 are possible sources of boron oxide char material. Source materials from Equation 15 and Equation 16 are possible sources of calcium oxide char material. After heat treatments, volatiles are released while only stable oxides remain in the final product and react to form a stable mixture of glass-ceramic coating material. The theoretical calculations of weight loss and char yields for each could be used to calculate the amount of source materials needed to design the particular anti-oxidant.

The weight percent of each oxide material can be achieved by using many possible source materials as shown in Table 2. Column one in this table contains many possible raw chemicals that can be used in the making of the anti-oxidant material and column two contains the possible ranges of each raw material used in this anti-oxidant. The last eight columns represent the percent of each oxide material after the raw material has been charred at elevated temperatures to remove all volatile materials. The volatile materials given off during a char cycle may include water, carbon dioxide, and chlorine gas.

The last row in Table 2 represents the range of the total percent weight of each oxide in the anti-oxidants disclosed in this invention.

TABLE 2

Master char sheet describing the char yield of various raw chemicals, and the composition ranges of either raw chemical or char oxide percentages for the anti-oxidants in this invention.

| Raw Chemicals | Chemical, wt % | P2O5, Char % | Al2O3, Char % | K2O, Char % | Na2O, Char % | CaO, Char % | MgO, Char % | SiO2, Char % | B2O3, Char % |
|---|---|---|---|---|---|---|---|---|---|
| deinoized H2O | 5-30% | 0.0% | 0.0% | 0.0% | 0.0% | 0.0% | 0.0% | 0.0% | 0.0% |
| 85% H3PO4 | 10-50% | 61.6% | 0.0% | 0.0% | 0.0% | 0.0% | 0.0% | 0.0% | 0.0% |
| Al(H2PO4)3 | 20-80% | 33.5% | 8.0% | 0.0% | 0.0% | 0.0% | 0.0% | 0.0% | 0.0% |
| Mn3(PO4)2*xH2O | 0-10% | 40.0% | 0.0% | 0.0% | 0.0% | 0.0% | 60.0% | 0.0% | 0.0% |
| K2CO3 | 0-20% | 0.0% | 0.0% | 68.2% | 0.0% | 0.0% | 0.0% | 0.0% | 0.0% |
| B2O3 | 2-20% | 0.0% | 0.0% | 0.0% | 0.0% | 0.0% | 0.0% | 0.0% | 100.0% |
| KCl | 0-20% | 0.0% | 0.0% | 62.4% | 0.0% | 0.0% | 0.0% | 0.0% | 0.0% |
| KOH | 0-20% | 0.0% | 0.0% | 83.9% | 0.0% | 0.0% | 0.0% | 0.0% | 0.0% |
| KH2PO4 | 0-40% | 52.2% | 0.0% | 34.6% | 0.0% | 0.0% | 0.0% | 0.0% | 0.0% |
| K2B4O7*4(H2O) | 0-40% | 0.0% | 0.0% | 22.8% | 0.0% | 0.0% | 0.0% | 0.0% | 33.7% |
| Na2CO3 | 0-20% | 0.0% | 0.0% | 0.0% | 58.5% | 0.0% | 0.0% | 0.0% | 0.0% |
| NaCl | 0-20% | 0.0% | 0.0% | 0.0% | 53.0% | 0.0% | 0.0% | 0.0% | 0.0% |
| NaOH | 0-20% | 0.0% | 0.0% | 0.0% | 77.5% | 0.0% | 0.0% | 0.0% | 0.0% |
| NaH2PO4 | 0-40% | 59.2% | 0.0% | 0.0% | 25.8% | 0.0% | 0.0% | 0.0% | 0.0% |
| Na2B4O7*4(H2O) | 0-30% | 0.0% | 0.0% | 0.0% | 22.7% | 0.0% | 0.0% | 0.0% | 51.0% |
| Al2O3 | 0-50% | 0.0% | 100.0 | 0.0% | 0.0% | 0.0% | 0.0% | 0.0% | 0.0% |
| CaCO3 | 0-20% | 0.0% | 0.0% | 0.0% | 0.0% | 56.0% | 0.0% | 0.0% | 0.0% |
| CaCl2 | 0-20% | 0.0% | 0.0% | 0.0% | 0.0% | 49.4% | 0.0% | 0.0% | 0.0% |
| SiO2 | 0-30% | 0.0% | 0.0% | 0.0% | 0.0% | 0.0% | 0.0% | 100.0% | 0.0% |
| TOTALS | | 30-75% | 3-25% | 0-20% | 0-20% | 0-20% | 0-20% | 0-10% | 2-25% |

The design of anti-oxidants outlined in Table 2 is based on a char composition approach. The weight percentages of glass formers, glass network modifiers, and glass intermediates in the anti-oxidant were calculated using weight percent chars of each oxide material yielded from raw chemicals during the char process. The anti-oxidants can be produced either by directly mixing the oxides specified in the last row of Table 2 with proper amounts of de-ionized water, or by mixing the raw chemicals specified in columns 1 and 2 in Table 3 for yielding the desired oxide chars upon heat treating.

After mixing liquid anti-oxidants, fine solid particles are usually present. This is because the amounts of solids and salts used in the formulation are much greater than their solubility limits in the phosphoric acid based liquid. Dispersion of these solid particles is helpful to the penetration of the anti-oxidants into CC composites in order for the anti-oxidants to facilitate superior oxidation protection. In order to disperse the solid particles in the liquid anti-oxidants, two methods are used: (1) adding small amounts, up to 1% by weight, of surfactants, and/or (2) blending with high speed, high shear colloidal grinder/mill. Examples of surfactants are DF-16, DF-20, and CF-10 supplied by Dow Chemical Company, and silicone surfactants supplied by BYK Additives and Instruments. Dow Chemical's DF and CF series of surfactants are composed of alcohols, C8-C10, ethoxylated propoxylated, and Poly(ethylene oxide). The silicone surfactants for aqueous solutions supplied by BYK Additives and Instruments, e.g., BYK 346, are basically a solution of a polyether modified dimethylpolysiloxane in solvents of Dipropyleneglycol monomethylether. There are a large number of commercial colloidal grinder/mills that are suitable for mixing and dispersing solid particles in anti-oxidants. The working principle of the colloidal mill is that under the effect of centrifugal force and being run by relatively high speed between the rotating gear and the fixed gear, the liquid and the semi-liquid materials is efficiently emulsified, homogenized, dispersed and mixed during the course of being cut, milled and shocked with high frequency. After colloidal mixing, the anti-oxidant product is extremely well-dispersed.

Formulation of Anti-Oxidants and Testing Results:

One series of anti-oxidants, designated as SP4C1 through 16, was designed using the char composition ranges described in Table 2 above. Considering the anti-oxidant of SP4C1 as an example, as shown in Table 3 below, the designed char composition of SP4C1 is P2O5 33.88%, Al2O3 4.52%, K2O 2.74%, and B2O3 2.41% by weights on a basis of 43.55% overall char yield. The anti-oxidant of SP4C-1 can be produced by mixing the above oxides directly with proper amounts of deionized water, or by mixing the raw chemicals listed in columns 1 and 2 in Table 3.

TABLE 3

Char composition and raw chemical composition of SP4C1.

| SP4C1 Raw Chemicals | wt % | Oxide char composition/yield | | | | Overall yield, wt % |
|---|---|---|---|---|---|---|
| | | P2O5, % | Al2O3, % | K2O, % | B2O3, % | |
| deinoized H2O | 12.82% | 0.00% | 0.00% | 0.00% | 0.00% | 0.00% |
| 85% H3PO4 | 24.36% | 61.56% | 0.00% | 0.00% | 0.00% | 61.56% |
| 50%, MAP, Al(H2PO4)3 | 56.39% | 33.48% | 8.02% | 0.00% | 0.00% | 41.50% |
| K2CO3 | 4.03% | 0.00% | 0.00% | 68.16% | 0.00% | 68.16% |
| B2O3 | 2.41% | 0.00% | 0.00% | 0.00% | 100.00% | 100.00% |
| TOTAL | 100.00% | 33.88% | 4.52% | 2.74% | 2.41% | 43.55% |

As another example, the anti-oxidant of SP4C5, as shown in Table 4, can be made by mixing 33.88% of P2O5, 4.52% of Al2O3, 2.74% of K2O, and 2.41% of B2O3 by weights on a basis of 44.04% overall char yield with proper amount of deionized water. Or, alternatively, the anti-oxidant can also be made by mixing the raw chemicals listed in columns 1 and 2 in Table 4.

TABLE 4

Char composition and raw chemical composition of SP4C5.

| SP4C5 Raw Chemicals | wt % | Oxide char composition/yield | | | | Overall yield, wt % |
|---|---|---|---|---|---|---|
| | | P2O5, | Al2O3, | K2O, | B2O3, | |
| deinoized H2O | 12.73% | 0.00% | 0.00% | 0.00% | 0.00% | 0.00% |
| 85% H3PO4 | 26.44% | 61.56% | 0.00% | 0.00% | 0.00% | 61.56% |
| 50%, MAP, Al(H2PO4)3 | 53.75% | 33.48% | 8.02% | 0.00% | 0.00% | 41.50% |
| K2CO3 | 5.10% | 0.00% | 0.00% | 68.16% | 0.00% | 68.16% |
| B2O3 | 1.98% | 0.00% | 0.00% | 0.00% | 100.00% | 100.00% |
| TOTALS | 100% | 34.27% | 4.31% | 3.48% | 1.98% | 44.04% |

Another example is given in Table 5 below. The anti-oxidant of SP4C11 can be made by mixing 31.98% of P2O5, 4.97% of Al2O3, 2.79% of K2O, and 2.92% of B2O3 by weights on a basis of 42.67% overall char yield with proper amount of deionized water. Or, alternatively, the anti-oxidant can also be made by mixing the raw chemicals listed in columns 1 and 2 in Table 5.

TABLE 5

Char composition and raw chemical composition of SP4C11.

| SP4C11 Raw Chemicals | wt % | Oxide char composition/yield | | | | Overall yield, wt % |
|---|---|---|---|---|---|---|
| | | P2O5, | Al2O3, | K2O, | B2O3, | |
| deinoized H2O | 12.74% | 0.00% | 0.00% | 0.00% | 0.00% | 0.00% |
| 85% H3PO4 | 18.21% | 61.56% | 0.00% | 0.00% | 0.00% | 61.56% |
| 50%, MAP, Al(H2PO4)3 | 62.02% | 33.48% | 8.02% | 0.00% | 0.00% | 41.50% |
| K2CO3 | 4.10% | 0.00% | 0.00% | 68.16% | 0.00% | 68.16% |
| B2O3 | 2.92% | 0.00% | 0.00% | 0.00% | 100.00% | 100.00% |
| TOTALS | 100% | 31.98% | 4.97% | 2.79% | 2.92% | 42.67% |

Experimental results from the 650° C. oxidation tests of CC samples coated with anti-oxidants SP4C1 through 15 are shown in FIG. 1. Two commercial materials, designated as "P38 commercial" and "BFG Patent", are also plotted in the figure for comparison with the SP4C series of anti-oxidants. The oxidation weight losses of CC coated with these commercial materials are greater than 3% after 25 hours of oxidation at 650° C. Comparing with the SP4C series of anti-oxidants, it is found that the SP4C series of materials are far better than the commercial materials; with the best oxidation time for 3% weight loss as high as 130 hours (SP4C-C).

Another series of anti-oxidants, designated as SP4C3-1 through 12, was also designed using the char composition ranges described in Table 2 above. Considering the anti-oxidant of SP4C3-1 as an example, as shown in Table 6 below, the designed char composition of SP4C1 is P2O5 35.68%, Al2O3 3.53%, K2O 4.14%, and B2O3 3.48% by weights on a basis of 46.84% overall char yield. This anti-oxidant can be produced by mixing the above oxides directly with proper amount of de-ionized water. Or, alternatively, the anti-oxidant can also be made by mixing the raw chemicals listed in columns 1 and 2 in Table 6.

TABLE 6

Char composition and raw chemical composition of SP4C3-1.

| SP4C3-1 Raw Chemicals | wt % | Oxide char composition/yield | | | | Overall yield, wt % |
|---|---|---|---|---|---|---|
| | | P2O5, | Al2O3, | K2O, | B2O3, | |
| deinoized H2O | 12.40% | 0.00% | 0.00% | 0.00% | 0.00% | 0.00% |
| 85% H3PO4 | 34.02% | 61.56% | 0.00% | 0.00% | 0.00% | 61.56% |
| 50%, MAP, | 44.02% | 33.48% | 8.02% | 0.00% | 0.00% | 41.50% |

TABLE 6-continued

Char composition and raw chemical composition of SP4C3-1.

| SP4C3-1 | | Oxide char composition/yield | | | | Overall yield, |
|---|---|---|---|---|---|---|
| Raw Chemicals | wt % | P2O5, | Al2O3, | K2O, | B2O3, | wt % |
| K2CO3 | 6.08% | 0.00% | 0.00% | 68.16% | 0.00% | 68.16% |
| B2O3 | 3.48% | 0.00% | 0.00% | 0.00% | 100.00% | 100.00% |
| TOTALS | 100% | 35.68% | 3.53% | 4.14% | 3.48% | 46.84% |

Another example is given in Table 7. The anti-oxidant of SP4C3-5 can be made by directly mixing 35.50% of P2O5, 3.51% of Al2O3, 4.84% of K2O, and 2.93% of B2O3 by weights on a basis of 46.78% overall char yield with proper amount of deionized water. Or, alternatively, the anti-oxidant can also be made by mixing the raw chemicals listed in columns 1 and 2 in Table 7.

TABLE 7

Char composition and raw chemical composition of SP4C3-1.

| SP4C3-5 | | Oxide char composition/yield | | | | Overall yield, |
|---|---|---|---|---|---|---|
| Raw Chemicals | wt % | P2O5, | Al2O3, | K2O, | B2O3, | wt % |
| deinoized H2O | 12.33% | 0.00% | 0.00% | 0.00% | 0.00% | 0.00% |
| 85% H3PO4 | 33.85% | 61.56% | 0.00% | 0.00% | 0.00% | 61.56% |
| 50%, MAP, | 43.79% | 33.48% | 8.02% | 0.00% | 0.00% | 41.50% |
| K2CO3 | 7.09% | 0.00% | 0.00% | 68.16% | 0.00% | 68.16% |
| B2O3 | 2.93% | 0.00% | 0.00% | 0.00% | 100.00% | 100.00% |
| TOTALS | 100% | 35.50% | 3.51% | 4.84% | 2.93% | 46.78% |

Another example is given in Table 7. The anti-oxidant of SP4C3-5 can be made by directly mixing 33.01% of P2O5, 4.24% of Al2O3, 4.08% of K2O, and 3.95% of B2O3 by weights on a basis of 45.27% overall char yield with proper amount of deionized water. Or, alternatively, the anti-oxidant can also be made by mixing the raw chemicals listed in columns 1 and 2 in Table 7.

TABLE 7

Char composition and raw chemical composition of SP4C3-1.

| SP4C3-11 | | Oxide char composition/yield | | | | Overall yield, |
|---|---|---|---|---|---|---|
| Raw Chemicals | wt % | P2O5, | Al2O3, | K2O, | B2O3, | wt % |
| deinoized H2O | 12.34% | 0.00% | 0.00% | 0.00% | 0.00% | 0.00% |
| 85% H3PO4 | 24.87% | 61.56% | 0.00% | 0.00% | 0.00% | 61.56% |
| 50%, MAP, Al(H2PO4)3 | 52.85% | 33.48% | 8.02% | 0.00% | 0.00% | 41.50% |
| K2CO3 | 5.99% | 0.00% | 0.00% | 68.16% | 0.00% | 68.16% |
| B2O3 | 3.95% | 0.00% | 0.00% | 0.00% | 100.00% | 100.00% |
| TOTALS | 100% | 33.01% | 4.24% | 4.08% | 3.95% | 45.27% |

Experimental results from the 650° C. oxidation tests of CC samples coated with anti-oxidants SP4C3-1 through 12 are shown in FIG. 2. Two groups of commercial materials, designated as "P38 commercial" and "BFG Patent", are also plotted in the figure for comparison with the SP4C3 series of anti-oxidants. The oxidation weight losses of CC coated with these commercial materials are greater than 3% after 25 hours of oxidation at 650° C. Comparing with the SP4C3 series of anti-oxidants, it is found that the SP4C3 series of materials are far better than the commercial materials; with the best oxidation time for 3% weight loss as high as 130 hours (SP4C-C).

The performance of SP4C3 series of anti-oxidants are also evaluated with 871° C. (1600° F.) oxidation tests. The results of SP4C3-1 through 12 tests are shown in FIG. 3. One commercial material, designated as "P38 commercial", is also plotted in the figure for comparison with the SP4C3 series of anti-oxidants. The oxidation weight loss of CC coated with this commercial material is greater than 3% after 2 hours of oxidation at 871° C. Comparing with the SP4C3 series of anti-oxidants, it is found that the SP4C3 series of materials are far better than the commercial materials; with the best oxidation time for 3% weight loss well in excess of 20 hours (SP4C3-4).

Catalytic oxidation tests at 650° C. with potassium formate were conducted to evaluate the catalytic oxidation protection of the anti-oxidants of this invention. FIG. 4 compares commercially available antioxidants (P38 and P39) to the SP4C anti-oxidants when exposed to potassium formate catalyst. Commercially available P38 and P39 materials have substantially worse catalytic oxidation protection when compared to the SP4C-based anti-oxidants. The results show that SP4C-Corner observed two percent weight loss in 75 hours at 650° C. where P38 material observed two percent weight loss in 10 hours at 650° C. The SP4C series anti-oxidants have proved to be more resistant to catalytic oxidation than commercially available materials.

The various glass-ceramics based antioxidant examples shown above illustrate a novel oxidation protection. A user of the present technology may choose any of the above implementation, or an equivalent thereof, depending upon the desired application. In this regard, it is recognized that various forms of the subject technology could be utilized without departing from the spirit and scope of the present invention.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the sprit and scope of the present invention.

REFERENCES

[1] Tatarzicki, Y., Webb, R., 1992, "Friction and Wear of Aircraft Brakes," ASM Handbook, Vol. 18, pp. 582-587.
[2] Blau, P., 2001, "Compositions, functions, and testing of friction brake materials and their additives," ORNL/TM-2001/64, Metals and Ceramic Division, Oak Ridge, Tenn.
[3] McAllister, L., 1989, "Barrier coating and penetrant providing oxidation protection for carbon-carbon materials" U.S. Pat. No. 4,837,073.
[4] Barmak, K., 1939, "Reaction kinetics in progresses of nucleation and growth," Vol. 135, pp. 416&58.
[5] Walker, T., Booker, L., Laurie, A., 2002, "Oxidation Protection for carbon/carbon composites and graphites," U.S. Pat. No. 6,455,159.
[6] Cairo, C., Florian, M., Graca, M., Bressiani, J., 2003, "Kinetic study by TGA of the effect of oxidation inhibitors for carbon-carbon composite," Materials Science and Engineering, Vol. 358, pp. 298-303.
[7] Bacos, M., 1993, "Carbon-carbon composites: oxidation behavior and coatings protection," Journal De Physique IV, Vol. 3, pp. 1895-1903.
[8] Tang, Z., Zou, Z., 2003, "Effects of carrier gas on densification of porous carbon-carbon composites during chemical vapor infiltration," Journal CSUT, Vol. 10, pp. 7-12.
[9] Lee, J., 2005, "Property enhancements via matrix microstructure modification of carboncarbon composites prepared by CVI processing," Journal of Material Science, Vol. 40, pp. 3573-3575.
[10] Delhaes, P., 2003, "Fibers and Composites." Taylor and Francis.
[11] Story, S., Fruehan, R., 2000, "Kinetics of oxidation of carbonaceous materials by CO2 and H2O between 1300° C. and 1500° C.," Metallurgical and Materials Transactions, Vol. 31, pp. 43-54.
[12] McKee, D., 1987, "Carbon oxidation catalyzed by low melting-point oxide phases," Carbon, Vol. 25, pp. 587-588.
[13] McKee, D., 1986, "Borate treatment of carbon fibers and carbon/carbon composites for improved oxidation resistance," Carbon, Vol. 24, pp. 737-741.
[14] McKee, D., 1988, "Oxidation behavior of matrix-inhibition carbon/carbon composites," Carbon, Vol. 26, pp. 659-665.
[15] McKee, D., 1987, "Oxidation behavior and protection of carbon/carbon composites," Carbon, Vol. 25, pp. 551-557.
[16] Sarkisov, P., Popovich, N., Orlova, L., Anan eva, Y., 2008, "Barrier coatings for type C/SiC ceramic-matrix composites (review)," Glass and Ceramics, Vol. 65, pp. 366-371.
[17] Yan, Z., Xiong, X., Xiao, P., Chen, F., Zhang, H., Haung, B., 2009, "Oxidation protective coatings prepared by slurry painting for C/C-SiC composites at 1500 C," Trans. Nonferrous Met. Soc. China, Vol. 19, pp. 61-64.
[18] Don, J., and Wang, Z., 2009, "Effects of anti-oxidant migration on friction and wear of C/C aircraft brakes," Applied Composite Materials, Vol. 16, pp. 73-81.
[19] Aoki, T., Hatta, H., Hitomi, T., Fukuda, H., Shiota, I., 2001, "SiC/C multi-layered coating contributing to the antioxidation of C/C composites and the suppression of through-thickness cracks in the layer," Carbon, Vol. 39, pp. 1477-1483.
[20] Walker, T., Booker, L., Shreve, M., and Koucouthakis, M., 2009, "Bi- or tri-layer anti-oxidant system for carbon composite brakes," U.S. Pat. No. 7,501,181.
[21] Li, T., Zheng, X., 1995, "Oxidation behavior of matrix-modified carbon-carbon composites at high temperature," Carbon, Vol. 33, pp. 469-472.
[22] Fu, Q., Li, H., Li, K., Shi, X., and Huang, M., 2007, "A SiC/glass oxidation protective coating for carbon/carbon composites for application at 1173 K," Carbon, Vol. 45, pp. 892-902.
[23] Smeacetto, F., Ferraris, M., and Salvo, M., 2003, "Multilayer coating with self-sealing properties for carbon-carbon composites," Carbon, Vol. 41, pp. 2105-2111.
[24] Dhami, T., Bahl, O., and Awasthy, B., 1995, "Oxidation-resistant carbon-carbon composites up to 1700° C.," Carbon, Vol. 33, pp. 479-490.
[25] Jian-Feng, H., Xie-Rong, Z., He-Jun, L., Xin-Bo, X., and Guo-ling, S., 2005, "ZrO2-SiO2 gradient multilayer oxidation protective coating for SiC coated carbon/carbon composites," Surface and Coatings Technology, Vol. 190, pp. 255-259.
[26] Smeacetto, F., Salvo, M., Ferraris, M., 2001, "Oxidation protective multilayer coatings for carbon-carbon composites," Carbon, Vol. 40, pp. 583-587.
[27] Yu-Lei, Z., He-Jun, L., Qian-Gang, F., Xi-Yuan, Y., Ke-Zhi, Y., and Geng-Sheng, J., 2008, "An oxidation protective Si—Mo—Cr coating for C/SiC coated carbon/carbon composites," Carbon, Vol. 46, pp. 179-182.
[28] Corral, E., Loehman, R., 2008, "Ultra-high-temperature ceramic coatings for oxidation protection of carbon-carbon composites," American Ceramic Society, Vol. 91, pp. 1495-1502.
[29] Zmii, V., Kartmazov, G., Kartsev, N., Ruden kii, S., Poltavtsev, N., 2006, "Carboborosilicate and oxide composite coatings on carbon materials," Powder metallurgy and Metal Ceramics, Vol. 45, pp. 124-128.
[30] Yamamoto, O., Sasamoto, T., and Inagaki, M., 1995, "Antioxidation of carbon-carbon composites by SiC concentration gradient and zircon overcoating," Carbon, Vol. 33, pp. 359-365.
[31] Kim, J., Kim, W., Choi, D., Park, J., Ryu, W., 2005, "Design of a C/SiC functionally graded coating for the oxidation of C/C composites," Carbon, Vol. 43, pp. 1749-1757.
[32] Biamino, S., Liedtke, V., Badini, C., Euchberger, G., Olivares, I., Pavese, M., Fino, P., 2008, "Multilayer SiC for thermal protection system of space vehicles: Manufacturing and testing under simulated re-entry conditions," Journal of the European Ceramic Society, Vol. 28, pp. 2791-2800.

[33] Park, S., and Seo, M., 2001, "The effects of MoSi2 on the oxidation behavior of carbon/carbon composites," Carbon Vol. 39, pp. 1229-1235.

[34] Golecki, D., 2004, "Oxidation-protective coatings for carbon-carbon components," U.S. Pat. No. 6,737,120.

[35] Stover, E., Dietz, R., 1995, "Inhibition of catalyzed oxidation of carbon-carbon composites," U.S. Pat. No. 5,401,440.

[36] Stover, E., 1998, "Method of inhibiting catalyzed oxidation of carbon-carbon composites," U.S. Pat. No. 5,759,622.

[37] Maier, C., and Jones, L., 2005, "The influence of aluminum phosphates on graphite oxidation," Carbon, Vol. 43, pp. 2272-2276.

[38] Wu, X., and Radovic, L., 2006, "Inhibition of catalytic oxidation of carbon/carbon composites by phosphorus," Carbon, Vol. 44, pp. 141-151.

[39] Wu, X., and Radovic, L., 2005, "Catalytic oxidation of carbon/carbon composite materials in the presence of potassium and calcium acetates," Carbon, Vol. 43, pp. 333-344.

[40] Wu, X., and Radovic, L., 2005, "Inhibition of catalytic oxidation of carbon/carbon composites by boron-doping," Carbon Vol. 43, pp. 1768-1777.

[41] Mazany, A., 2004, "Oxidation inhibition of carbon-carbon composites," U.S. Pat. No. 213,906.

[42] Radovic, L., 2008, "Chemistry and Physics of Carbon," Taylor and Francis, Chap. 6.

[43] Grandini, C., DeAlmeida, L., Santos, C., and Hernandes, A., 2006, "Anelastic spectroscopy in potassium aluminum metaphosphate glasses," Journal of Non-Crystalline Solids, Vol. 352, pp. 3410-3413.

[44] Schneider, J., Oliveira, S., Nunes, L., Bonk, F., and Panepucci, H., 2005, "Short-Range structure and cation bonding in calcium-aluminum metaphosphate glasses," Inorganic Chemistry, Vol. 44, pp. 423-430.

[45] Karabulut, M., Metwalli, E., and Brow, R., 2001, "Structure and properties of lanthanumaluminum-phosphate glasses," Journal of Non-Crystalline Solids, Vol. 283, pp. 211-219.

[46] Brow, R., 2000, "Review: the structure of simple phosphate glasses," Journal of NonCrystalline Solids, Vol. 263 & 264, pp. 1-28.

[47] Kishioka, A., Hayashi, M., and Kinoshita, M., 1976, "Glass formation and crystallization in ternary phosphate systems containing Al2O3," Bulletin of the Chemical Society of Japan, Vol. 49 (11), pp. 3032-3036.

[48] Mohanty, M., Honaker, R., 1999, "Performance optimization of Jameson flotation technology for fine coal cleaning," Minerals engineering, Vol. 12, pp. 367-381.

I claim:

1. A glass-ceramics based antioxidant for oxidation protection of carbon materials comprising:
   a water-based anti-oxidant having a char composition range of about 30 to 75 wt % P2O5, about 3 to 25 wt % Al2O3, about 0 to 20 wt % K2O, about 0 to 20 wt % Na2O, about 0 to 20 wt % CaO, about 0 to 20% MgO, about 0 to 10 wt % SiO2, about 3 to 25 wt % B2O3, and said water-based anti-oxidant having a balance of de-ionized water, and where the water-based anti-oxidant comprises, raw chemical composition having a range of de-inoized H2O about 5-30%, 85% H3PO4 about 10-50%, Al(H2PO4)3 about 5-30%, K2CO3 about 3-20%, B2O3 about 2-20%, KCl about 0-20%, KOH about 0-20%, KH2PO4 about 0-40%, K2B4O7*4(H2O) about 0-40%, Na2CO3 about 0-20%, NaCl about 0-20%, NaOH about 0-20%, NaH2PO4 about 0-40%, Na2B4O7*4(H2O) about 0-30%, Al2O3 about 0-50%, CaCO3 about 0-20%, CaCl2 about 0-20%, and SiO2 about 0-30%.

2. The antioxidant as recited in claim 1, where an aqueous mixture of the water-based anti-oxidant is applied to regions of a carbon material.

3. The antioxidant as recited in claim 2, where the aqueous mixture is mixed using a high speed, high shear colloidal grinders/mill to produce a well dispersed colloidal liquid.

4. The antioxidant as recited in claim 1, where an aqueous mixture the water-based anti-oxidant is applied to regions of a carbon material.

5. The antioxidant as recited in claim 1, where the aqueous mixture is mixed using a high speed, high shear colloidal grinders/mill to produce a well dispersed colloidal liquid.

6. A method for using glass-ceramic based antioxidants for oxidation protection comprising:
   deriving precursors from raw materials where the precursors include appropriate percentages of glass formers, glass network modifiers and glass intermediates; deriving a liquid antioxidant by mixing the precursors, wherein the liquid antioxidant is the water-based anti-oxidant of claim 1; applying the liquid antioxidant to a carbon material; and charring the applied liquid antioxidant to form a stable glass and crystalline ceramic protection.

* * * * *